ns of ethylene, propylene, and 1-butene.

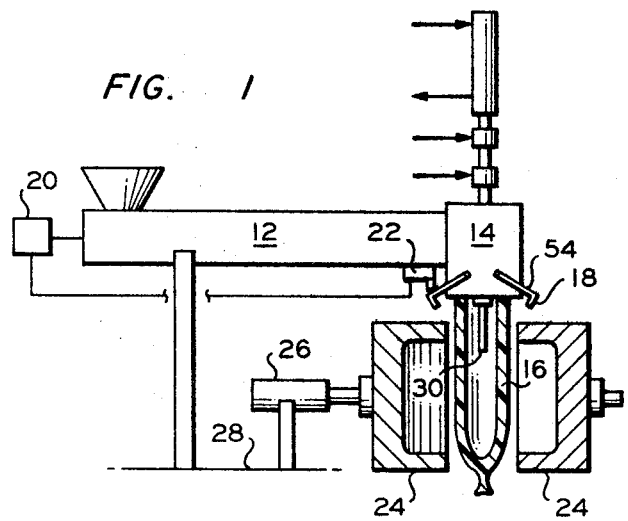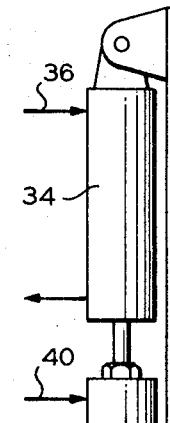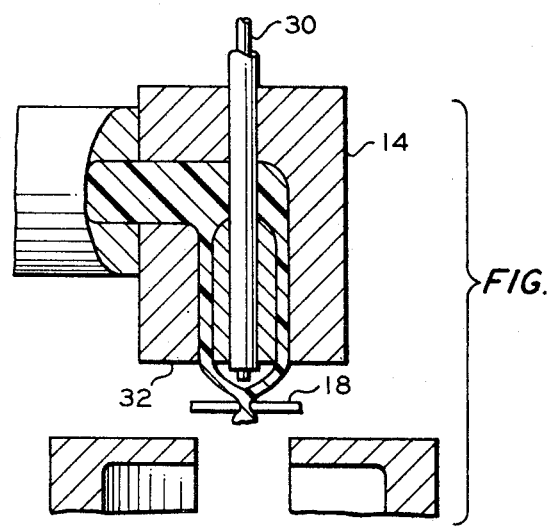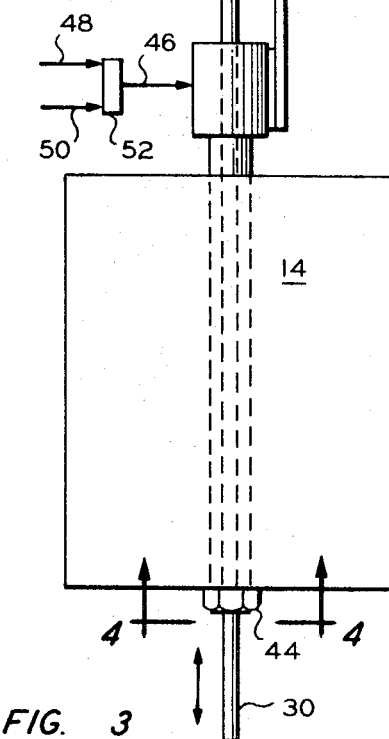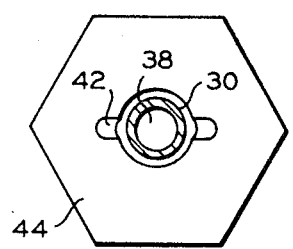

United States Patent Office 3,584,091
Patented June 8, 1971

3,584,091
PROCESS USING AN EXTENDABLE BLOW PIN WITH PREPINCHED, BLOWN PARISONS
Thomas J. Nave, Bartlesville, Okla., assignor to
Phillips Petroleum Company
Filed July 10, 1969, Ser. No. 840,744
Int. Cl. B29c 17/07
U.S. Cl. 264—89                                 4 Claims

ABSTRACT OF THE DISCLOSURE

In the extrusion of thermoplastic parisons, a retractable blow pin and prepinching members are provided. The blow pin is retracted to allow the prepinching members to seal off the parison at a point adjacent the die face. Preblow fluid is introduced and the blow pin extended to allow the mold to close on it. The preblow fluid is preferably programmed to allow higher introduction pressure as the parison nears its full drop.

BACKGROUND OF THE INVENTION

This invention relates to improved process and apparatus for forming hollow articles for blow molding.

While patents in the blow molding art go back over 100 years, it has only been in the last dozen years that this technique has achieved significant commercial success. This recent success has been due, partly, to the high volume demand for simple molded objects such as bottles and also, because of the sophisticated techniques developed to allow molding or complex shapes which would not ordinarily be thought of as being susceptible to blow molding. With the great volume of blow molding now in evidence, it has developed that even slight improvements in the technique are of great importance. Particularly important are techniques which reduce cycle time and improvements which allow more uniform polymer distribution throughout the walls of the resulting article.

SUMMARY OF THE INVENTION

It is an object of this invention to reduce cycle time in blow molding operations;

It is a further object of this invention to produce a blow molded article having improved distribution of polymer throughout the wall sections; and It is a further object of this invention to allow formation of parisons having a greater length-to-diameter ratio.

In accordance with this invention, a method utilizes a parison-forming apparatus is provided which apparatus utilizes prepinching members and an axially retractable blow pin which retracts essentially flush with the face of the die to allow the prepinching members to seal the parison at a point adjacent the die face.

BRIEF DESCRIPTION OF THE DRAWINGS

In the drawings, forming a part hereof, wherein like reference characters denote like parts in the various views, FIG. 1 is a schematic representation of a blow molding apparatus in accordance with the invention; FIG. 2 is a detailed view of the die head and pinching members of FIG. 1; FIG. 3 is a detailed view of the blow pin and associated equipment of FIG. 1; and FIG. 4 is a view along line 4—4 of FIG. 3.

DESCRIPTION OF THE PREFERRED EMBODIMENTS

The process of the instant invention is applicable in the blow molding of any thermoplastic material conventionally used in the industry. Exemplary materials are polymers of at least one mono-1-olefin having 2 to 8 carbon atoms per molecule, poly(vinyl chloride), cellulosics, acetal resins, polycarbonate resins, and the like.

Particularly suitable resins are polymers and copolymers of ethylene, propylene, and 1-butene.

This invention is applicable to the blow molding of any type of articles conventionally blow molded, such as bottles and the like. It is of particular utility in the blow molding of articles having a relatively long configuration or in the blow molding of two or more separate articles in tandem wherein a relatively long length of parison is extruded prior to closing the molds.

The reciprocal preblow pin can be of any hollow configuration such as square or triangular, however, it will generally be a simple tubular material such as a pipe. It is preferred that it be withdrawn in the retracted position to a point as nearly as possible flush with the die face so as to allow prepinching the parison as quickly as possible after it begins to issue from the die. A narrow retaining bushing can be utilized as shown in the drawings, however, which projects below the face of the die a short distance.

While the blow pin could be retained by other means, it is preferred to have a retaining bushing adjacent the die face and allow the preblow fluid to enter through longitudinally directed channels around the inner circumference of the retaining bushing, as shown in FIG. 4. In this way, preblow fluid can be introduced separate from the main blow fluid, and therefore, a conventional check valve can be used in the main blow line. It has been found that superior moldings can be obtained by pinching the parison quickly after it first emerges from the die face and then introducing preblow fluid slowly, as opposed to allowing the parison to be extruded below the normal extension of the preblow line for prepinching. For one thing, the preblow fluid can be added under more controlled conditions to achieve a more uniform wall thickness, and also, it can be added as the parison is extruded, therefore, eliminating the need for increasing the cycle time to allow for introduction of the preblow fluid as would be necessitated if the parison were completely extruded prior to pinching.

The blow pin can extend downwardly to a point anywhere within the interior of the article to be molded, the only requirement being that it extend far enough down that the parison is caugh between the blow pin and the upper portion of the mold as the mold closes. It is not feasible in many instances to circumvent the problems associated with prepinching at a point below the lowermost extension of an extended blow pin by positioning the blow pin in a stationary position flush with the die face, since this would result in the production of many reject parts because of the tendency of occasional parisons to become so disposed that the blow fluid ruptures the parison and is introduced between the parison wall and the mold wall, and also because the blow fluid tends to rupture the parison wall and escape laterally between the top of the mold and the bottom of the die face, thus cooling the die face which is undesirable, and if the escape is of sufficient magnitude, causing the part to be incompletely blown.

Both of these problems are circumvented in accordance with the instant invention, and in addition, the instant invention when used in combination with a two-step preblow, allows the production of parts from much longer parisons than had heretofore been possible, thus allowing the production of separate parts in tandem or the production of parts having an unusually high length-to-width ratio.

The preblow fluid will generally be introduced under a pressure of 1 to 40 p.s.i.g. In a preferred embodiment, preblow fluid is introduced in separate stages. This programmed introduction of the preblow fluid can occur in a fashion whereby the pressure is progressively increased or preblow fluid can be introduced initially under a first pressure and thereafter introduced under a second pressure. This latter method is entirely satisfactory and is preferred from the standpoint of simplicity and equipment design. In this preferred embodiment where the preblow fluid is introduced at a first pressure initially, and thereafter, preblow fluid at a second, higher, pressure is introduced, the initial pressure of the preblow fluid will generally be between 1 and 20 p.s.i.g., preferably between 3 to 6 p.s.i.g. The second stage preblow fluid will generally be at a pressure within the range of 6 to 40 p.s.i.g., preferably within the range of 7 to 25 p.s.i.g. The specific pressure will vary, of course, depending on the thickness of the parison, the size of the parison, and the size and number of the introduction points. While there is some overlap in the operable ranges of first and second stage preblow fluid, it is understood that the second stage preblow fluid will be introduced at a higher pressure than the first in all instances; generally the second stage will be at a pressure at least 25 percent higher than the first. The pressure of the main blow fluid is not critical and can be any pressure standard in the industry. Pressures of 30-120 p.s.i.g., more generally 40-90 p.s.i.g., are commonly used. In the preferred embodiment where preblow fluid is introduced in two stages, it is further preferred that the speed of the parison extrusion be increased during the final stages of the extrusion of the parison. This combination of two-stage preblow and programmed extrusion speed has been found to give more uniform wall thickness in the final part.

Referring now to figures, particularly FIG. 1, there is shown a conventional extruder 12 having a die head 14. Issuing from an annular die in die head 14 is parison 16. A pair of opposed prepinching members 18 are shown in retracted or open position having already pinched the parison shut in a manner shown in FIG. 2. Extruder 12 is powered by motor 20. Means 22 is provided to control the speed of the motor in response to the stage of the extrusion cycle as indicated by the time the prepinching members 18 close. The programming of the extrusion rate can also be accomplished by using an accumulator with programmed expulsion of melt; thus extruder would run continuously at its set r.p.m. Mold halves 24 are opened and closed by piston means 26 carried by frame 28. Blow pin 30 is shown in FIGS. 1 and 3 in its extended position and is shown in FIG. 2 in its retracted position.

Referring specifically to FIG. 2, prepinching members 18 are shown sealing together the walls of the parison at a point adjacent the die face 32.

Referring now to FIG. 3, there is shown in greater detail the pneumatic arrangements by which the blow pin is raised and lowered and the blow fluid is introduced. Blow pin 30 is advanced and retracted by means of air cylinder 34 which is activated by air from line 36 which line is connected to a four-way valve not shown. The main blow fluid is introduced through the hollow center 38 of blow pin 30 which is simply a section of pipe. Fluid is introduced through line 40.

The preblow fluid is introduced through longitudinal recesses 42 in support bushing 44. Line 46 connects with channels 42. First stage low pressure preblow fluid line 48 and second stage higher pressure preblow fluid line 50 connect with line 46 through means 52.

Arm means 54 serve to close and open pinching means 18.

Many conventional items such as heaters, temperature control regulators, insulators, brackets, and the like have not been shown for the sake of simplicity, but their inclusion is understood by those skilled in the art and are within the scope of the invention.

EXAMPLE

Polyethylene homopolymer having a density of 0.960 (ASTM D 1505–63T) and a melt index of 0.9 (ASTM D 1238–62T, Condition E) was extruded from an apparatus similar to that shown in the figures, the die having an annular opening of 4½ inches in diameter. The die was equipped with a concentric blow pin such as that shown in the figures. The blow pin was retracted on the initial extrusion of the parison and pinching members such as those shown in the figures were closed upon the parison to pinch it shut. Initial preblow air at 5 p.s.i.g. was introduced. As the extrusion progressed to give a final parison length of 30 inches, the extrusion speed was increased and just prior to closing the mold, 25 p.s.i.g. preblow air was introduced. During this time, the blow pin was extended to a position such as that shown in FIGS. 1 and 3. A mold having two cavities in tandem with a small channel milled between the first and second cavities was closed on the parison with the upper wall of the upper mold gripping the parison between the mold wall and the blow pin. Ninety p.s.i.g. blow air was introduced which expanded the parison against the upper mold cavity and ruptured the plastic in the channel between the two cavities so as to allow the air to enter the lower cavity and blow it also. The total cycle time was 20 seconds. The walls of the part had a thickness of 0.021 inch with very little variation. The weight of each part was approximately 110 grams. Numerous parts were made in this manner, and it was found that the variation in weight was no more than +5 or −5 grams.

While this invention has been described in detail for the purpose of illustration, it is not to be construed as limited thereby but is intended to cover all changes and modifications within the spirit and scope thereof.

I claim:
1. A method of forming blow molded hollow articles comprising: forming a cylindrical parison by melt extrusion in a downward direction of a thermoplastic material; pinching shut walls of said parison at a point adjacent its point of emergence from an annular extrusion zone; introducing low pressure preblow fluid into said parison during an initial stage of its extrusion; thereafter increasing the rate of extrusion and introducing preblow fluid under a higher pressure to provide an elongated parison of substantially uniform wall thickness; extending a blow pin downwardly from a point adjacent the annular extrusion zone; closing a mold about said parison, thereby pressing a portion of said parison to said blow pin to form a neck finish and to seal the interior of the parison off from the atmosphere so as to prevent escape of blow fluid; and introducing a blow fluid through said blow pin to expand said parison into conformity with said mold.

2. A method according to claim 1 wherein said thermoplastic material is a polymer of at least one mono-1-olefin having 2–8 carbon atoms per molecule.

3. A method according to claim 1 wherein said low pressure preblow fluid is under a pressure of 3–6 p.s.i.g. and said preblow fluid under greater pressure is under a pressure of 7–25 p.s.i.g.

4. A method according to claim 3 wherein said main blow fluid is under a pressure of 40–90 p.s.i.g.

References Cited

UNITED STATES PATENTS

| | | | |
|---|---|---|---|
| 3,012,286 | 12/1961 | Gasmire | 264—97 |
| 3,300,556 | 1/1967 | Battenfield et al. | 264—98 |
| 3,425,090 | 2/1969 | Nave et al. | 264—98X |
| 3,504,396 | 4/1970 | Button et al. | 264—99X |
| 3,509,596 | 5/1970 | Shaw et al. | 264—99X |

ROBERT F. WHITE, Primary Examiner

T. J. CARVIS, Assistant Examiner

U.S. Cl. X.R.

18—5; 264—98